(12) United States Patent
Seko et al.

(10) Patent No.: US 7,502,297 B2
(45) Date of Patent: Mar. 10, 2009

(54) HOLOGRAM RECORDING APPARATUS, HOLOGRAM REPRODUCING APPARATUS, HOLOGRAM RECORDING METHOD, AND HOLOGRAM REPRODUCING METHOD

(75) Inventors: Satoru Seko, Kanagawa (JP); Kazuyuki Hirooka, Gunma (JP)

(73) Assignee: Sony Corporation (JP)

( * ) Notice: Subject to any disclaimer, the term of this patent is extended or adjusted under 35 U.S.C. 154(b) by 618 days.

(21) Appl. No.: 11/311,860

(22) Filed: Dec. 19, 2005

(65) Prior Publication Data
US 2006/0164948 A1 Jul. 27, 2006

(30) Foreign Application Priority Data
Dec. 20, 2004 (JP) ............................ P2004-368165

(51) Int. Cl.
*G11B 7/00* (2006.01)
(52) U.S. Cl. .................................................. 369/103
(58) Field of Classification Search ................ 369/103, 369/109.01, 94; 359/10, 11
See application file for complete search history.

(56) References Cited
U.S. PATENT DOCUMENTS
6,377,367 B1 * 4/2002 Suganuma ................. 359/11
6,961,161 B2 * 11/2005 Tsukagoshi et al. ........... 359/10
7,012,722 B2 * 3/2006 Ogasawara ............ 369/112.01
7,130,092 B1 * 10/2006 Horimai ..................... 369/103
7,236,441 B2 * 6/2007 Tanaka et al. ............... 369/103
7,394,581 B2 * 7/2008 Toishi ......................... 359/10

FOREIGN PATENT DOCUMENTS
JP 2003-085768 A 3/2003
JP 2003-178458 A 6/2003

* cited by examiner

*Primary Examiner*—Thang V Tran
(74) *Attorney, Agent, or Firm*—Lerner, David, Littenberg, Krumholz & Mentlik, LLP (57) ABSTRACT

A hologram recording apparatus includes a rotating mechanism for rotating a hologram recording medium, a first light source for emitting first laser light, a modulator for modulating the intensity of the emitted first laser light to record a hologram on the hologram recording medium, a second light source for emitting second laser light with which a predetermined signal pattern is read from the rotating hologram recording medium, and a controller operable to exert control on the basis of the read signal pattern so that the intensity of the first laser light is modulated by the modulator while the first laser light is being oscillated and so that a beam spot of the first laser light is applied onto the hologram recording medium in periods in which the relative velocity between the target recording region and the beam spot becomes almost zero.

10 Claims, 7 Drawing Sheets

HOLOGRAM RECORDING APPARATUS, HOLOGRAM REPRODUCING APPARATUS, HOLOGRAM RECORDING METHOD, AND HOLOGRAM REPRODUCING METHOD

CROSS-REFERENCE TO RELATED APPLICATIONS

The present application claims priority from Japanese Patent Application No. JP 2004-368165 filed on Dec. 20, 2004, the disclosure of which is hereby incorporated by reference herein.

BACKGROUND OF THE INVENTION

The present invention relates to a hologram recording apparatus and method that records data by holography, and to a hologram reproducing apparatus and method that reproduces data recorded by holography.

In holographic data recording, two laser beams, a modulated (data superimposed) signal light beam and an unmodulated reference light beam, are generated from laser light, and are applied onto the same position on a hologram recording medium. Consequently, the signal light beam and the reference light beam interfere with each other on the hologram recording medium, and a diffraction grating (hologram) is thereby formed at the irradiated position and is recorded as data on the hologram recording medium.

Some hologram recording and reproducing apparatuses record data, for example, by using both red laser light and blue laser light. Red laser light is used to read an address servo pattern prerecorded in the form of pits on the recording medium and to access a target address according to the read pattern. Blue laser light is used to record data on a hologram recording layer different from a layer in which the address servo pattern is recorded.

In hologram recording and reproducing apparatuses, it is required that the position and angle of a beam be fixed during recording or reproduction, and that reproducibility thereof be high. In a disc-type recording and reproducing apparatus, recording or reproduction is typically performed while a disc serving as a recording medium is being rotated at a constant velocity. For example, the rotation of an optical disc is not started or stopped every time one pit is recorded thereon. This is because rapid acceleration or deceleration of the disc increases the inertia of the disc, and results in excessive energy consumption.

This apparatus is required to record or reproduce a hologram within a short time. Since a disc serving as a hologram recording medium slightly rotates even during recording or reproduction, when recording or reproduction continues beyond a predetermined time, the position of a beam spot of laser light on the disc is not satisfactorily fixed.

There are the following limitations on reduction of the recording and reproduction time. A certain amount of light power is necessary to expose a recording medium to light. In order to increase the laser power for that purpose, a higher-power laser element and more electric power are necessary. Therefore, from the viewpoint of recording efficiency, it is preferable that the required laser power be as low as possible, and as a result, it is preferable that the exposure time be as long as possible. During reproduction, a highly sensitive light receiving element is necessary to obtain the required reproduction S/N ratio in a short observation time. Therefore, in order to optimize the S/N ratio, it is preferable that the laser power applied to the light receiving element be large, or the exposure time be long, as disclosed in Japanese Unexamined Patent Application Publication No. 2003-85768.

In order to satisfy these opposite conditions, Japanese Unexamined Patent Application Publication No. 2003-178458 discloses an apparatus in which the relative velocity between a recording and reproducing beam and a disc is zero or considerably close to zero while the beam is reciprocatingly oscillated in the same direction as the rotating direction of the disc.

However, in the apparatus disclosed in the latter publication, since an objective lens is oscillated in the rotating direction of the disc by an actuator, for example, when two laser light beams, red laser light and blue laser light, are used, as described above, both the laser light beams are oscillated. As a result, it is difficult to read the address with the red laser light, and to synchronize the rotation of the disc and recording or reproducing operation.

When the time for high-speed recording and reproduction, that is, the time t taken from when an operation of recording (or reproducing) one hologram until when an operation of recording (or reproducing) the next hologram decreases, that is, $1/t=f$ (Hz) increases, it is difficult to properly control the reciprocating motion of the objective lens. In this case, f represents the reciprocation frequency. In order to achieve desired recording density and transfer rate in actual products, for example, it is necessary to write multiple holograms so that the holograms are shifted from one another by 10 to 20 $\mu$m when f=1 kHz. In this case, even if the deviation between the beam application position and the target recording position on the disc can be obtained according to signals indicating information about the absolute position on the disc in the rotating circumferential direction, it may be actually impossible for the beam to follow the target recording position with high precision. Even if the beam can follow the target recording position, when the recording frequency is high, as described above, an unnecessarily high accuracy in measuring the deviation from the target position, a high sample frequency, a wide servo control region, and an actuator having a wide piston motion range are necessary. This is not practical.

It is desirable to provide a hologram recording apparatus, a hologram reproducing apparatus, a hologram recording method, and a hologram reproducing method that can perform recording and reproduction with as long exposure time as possible even when two types of laser light beams are used.

It is also desirable to provide a hologram recording apparatus and a hologram recording method that allow reliable recording at a desired recording position even when the reciprocation frequency is high. It is also desirable to provide a hologram reproducing apparatus and a hologram reproducing method that can reproduce signals, which are recorded by the above apparatus and method, with a high S/N ratio.

SUMMARY OF THE INVENTION

A hologram recording apparatus according to an embodiment of the present invention includes a rotating mechanism for rotating a hologram recording medium; a first light source for emitting first laser light; a modulator for modulating the intensity of the emitted first laser light to record a hologram on the hologram recording medium; a second light source for emitting second laser light with which a predetermined signal pattern is read from the rotating hologram recording medium, the predetermined signal pattern being used to apply the modulated first laser light to a target recording region on the hologram recording medium; and control means for exerting control on the basis of the read signal pattern so that the intensity of the first laser light is modulated by the modulator while the first laser light is being oscillated and so that a beam spot of the first laser light is applied onto the hologram recording medium in periods in which the relative velocity between the target recording region on the rotating hologram recording medium and the beam spot of the first laser light becomes almost zero.

In the embodiment of the present invention, the second laser light is not oscillated, but only the first laser light is oscillated by an oscillator. With this, even when both the first laser light and the second laser light are used, the signal pattern can be reliably read by the second laser light, and the beam spot of the first laser light can be applied to the target recording region. Moreover, the time for which the beam spot is applied onto the same position on the hologram recording medium is increased by oscillating only the first laser light, that is, the exposure time is maximized. Therefore, recording can be performed with a sufficient exposure, and reproduction can be performed with a high S/N ratio.

The target recording region has a size larger than the diameter of the beam spot of the first laser light, and may be long to some extent in the rotating direction. In this respect, the target recording region is different from a "target spot" used during reproduction that will be described below. This is because the hologram reproducing apparatus has information about the hologram recording position during reproduction.

Preferably, the control means includes an optical member provided on an optical path to guide the first laser light emitted from the first light source to the modulator, and a driving element for oscillating the optical member. This feature allows oscillation of the first laser light. The optical member may be disposed between the modulator and an objective lens, instead of being disposed between the first light source and the modulator. That is, the control means may include an optical member for guiding the modulated first laser light to the objective lens, and a driving element for oscillating the optical member. The optical member is, for example, a mirror. However, the optical member may be any member that can guide the first laser light to the modulator. The objective lens serves to guide the first laser light and the second laser light to the hologram recording medium.

Preferably, the control means includes a memory that stores information about an oscillation condition for oscillating the first laser light, and a control unit for exerting control such that the intensity of the first laser light is modulated by the modulator while driving the driving element according to the stored information. Since the oscillation condition is prestored, data recording can be performed while oscillating the first laser light without any complicated feedback control. In particular, even when the frequency is high when holograms are recorded, since feedback control is not exerted, signals can be easily recorded as holograms.

Preferably, the memory stores amplitude information as the oscillation condition. The amplitude information can be optimized in a production stage of the hologram recording apparatus. More specifically, in the production stage, an operator adjusts the amplitude information by inputting, to the driving element, a gain such that the relative velocity between a target recording region of the rotating hologram recording medium and a beam spot of the first laser light applied onto the hologram recording medium becomes almost zero. For example, when the amplitude varies because of changes of the hologram recording apparatus with passage of time, a user may appropriately update the amplitude information.

Preferably, a clock pattern for hologram recording and a pattern indicating the reference rotational position of the hologram recording medium are prerecorded as the signal pattern on the hologram recording medium. The control means includes clock generating means for generating clocks on the basis of the clock pattern, counting means for counting the generated clocks, and means for storing the clock count value from the reference rotational position in the memory. This allows data to be reliably recorded at a desired circumferential position on the hologram recording medium.

A hologram reproducing apparatus according to another embodiment of the present invention includes a rotating mechanism for rotating a hologram recording medium; a first light source for emitting first laser light; generating means for generating reference light from the emitted first laser light in order to reproduce signals recorded on the hologram recording medium; a second light source for emitting second laser light with which a predetermined signal pattern is read from the rotating hologram recording medium, the predetermined signal pattern being used to apply the emitted first laser light to a target spot on the hologram recording medium; and control means for exerting control on the basis of the read signal pattern so that the reference light is generated by the generating means while the first laser light is being oscillated and so that a beam spot of the first laser light is applied onto the hologram recording medium in periods in which the relative velocity between the target spot on the rotating hologram recording medium and the beam spot of the first laser light becomes almost zero.

In the above embodiment of the present invention, the signal pattern can be reliably read with the second laser light, and the first laser light can be applied to the target spot for reproduction even when both the first laser light and the second laser light are used. Moreover, since the first laser light is oscillated, reproduction can be performed with a high S/N ratio.

A hologram recording method according to a further embodiment of the present invention includes emitting first laser light to record a hologram on a rotating hologram recording medium; emitting second laser light to read a predetermined signal pattern from the rotating hologram recording medium in order to apply the first laser light to a target recording region on the hologram recording medium; and modulating the intensity of the first laser light while oscillating the first laser light on the basis of the read signal pattern so that a beam spot of the first laser light is applied to the recording medium in periods in which the relative velocity between the target recording region on the rotating hologram recording medium and the beam spot becomes almost zero.

A hologram reproducing method according to a still further embodiment of the present invention includes emitting first laser light to reproduce hologram signals recorded on a rotating hologram recording medium; emitting second laser light to read a predetermined signal pattern from the rotating hologram recording medium in order to apply the first laser light to a target spot on the hologram recording medium; and generating reference light from the first laser light while oscillating the first laser light on the basis of the read signal pattern so that a beam spot of the first laser light is applied to the hologram recording medium in periods in which the relative velocity between the target spot on the rotating hologram recording medium and the beam spot becomes almost zero.

As described above, according to the embodiments of the present invention, recording and reproduction can be performed with as long exposure time as possible even when two types of laser light beams are used. Further, even when the reciprocation frequency is high, recording on a desired recording position can be reliably performed, and signals recorded in this manner can be reproduced with a high S/N ratio.

DETAILED DESCRIPTION

An embodiment of the present invention will be described below with reference to the attached drawings.

Figure 1:
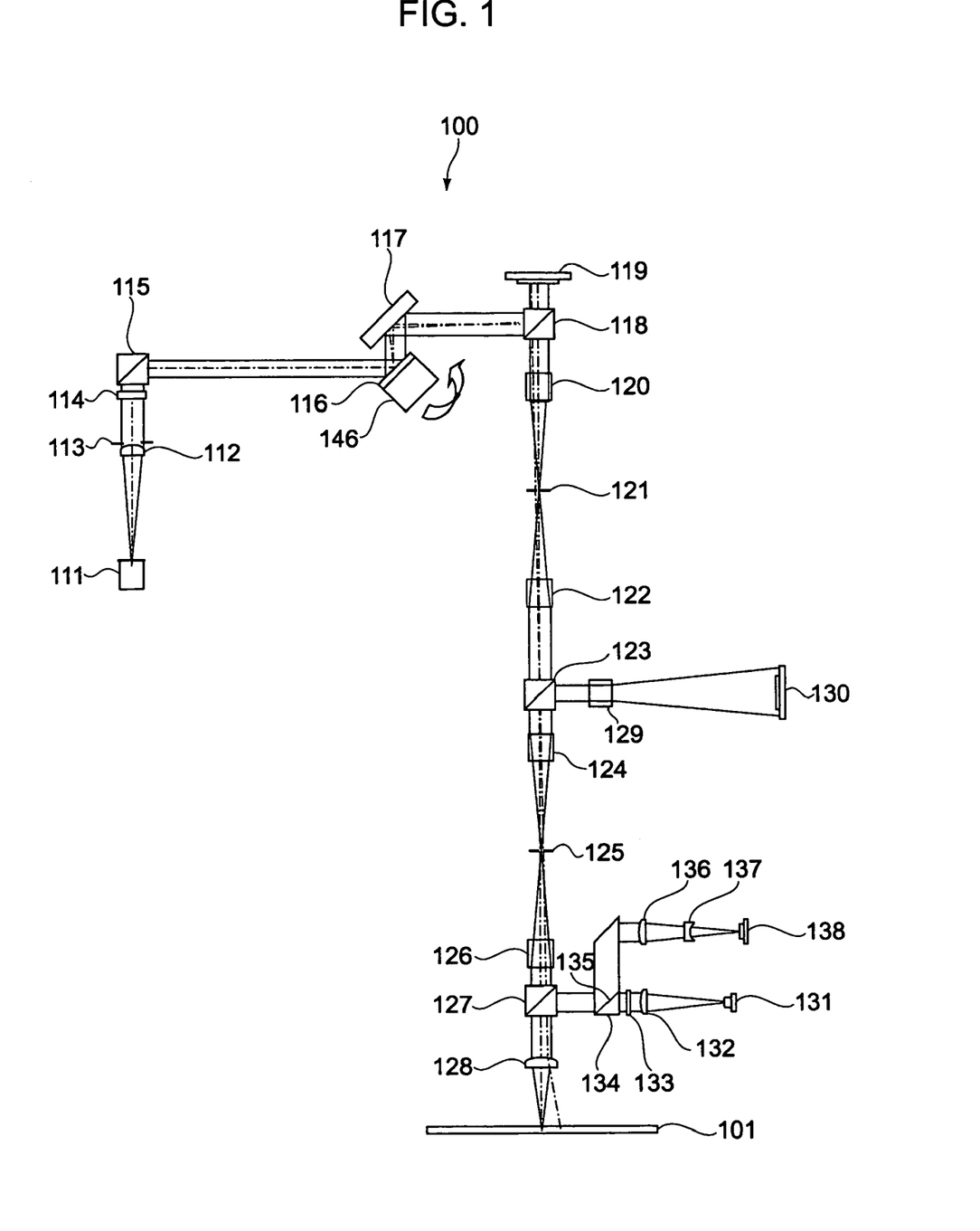
FIG. 1 is a schematic view of an optical unit in a hologram recording and reproducing apparatus according to an embodiment of the present invention.

FIG. 1 is a schematic view of an optical unit in a hologram recording and reproducing apparatus according to the embodiment of the present invention.

The hologram recording and reproducing apparatus performs recording and reproduction of information on and from a hologram recording medium 101, and includes an optical unit 100, as shown in FIG. 1.

The optical unit 100 includes a recording and reproduction light source 111, a collimator lens 112, a shielding plate 113, a half-wave plate 114, a polarization beam splitter 115, an image stabilization (IS) mirror 116, a mirror 117, a polarization beam splitter 118, a spatial light modulator 119, a lens 120, a shielding plate 121, a lens 122, a polarization beam splitter 123, a lens 124, a shielding plate 125, a lens 126, a dichroic mirror 127, an objective lens 128, a concave lens 129, an image pickup device 130, a servo light source 131, a collimator lens 132, a grating 133, a beam splitter 134, a mirror 135, a light collecting lens 136, a cylindrical lens 137, and a light receiving element 138.

Figure 2:
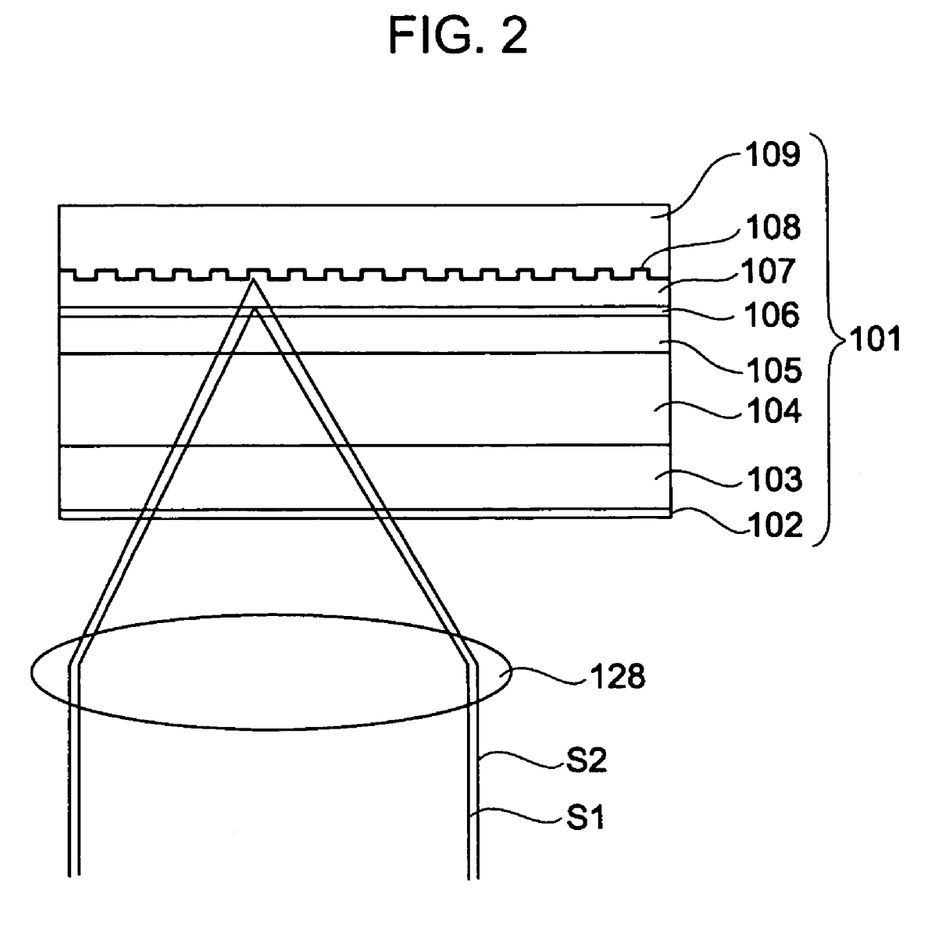
FIG. 2 is an explanatory view showing a cross-sectional structure of a hologram recording medium.

The hologram recording medium 101 is shaped like a disc in plan view, and includes an antireflection film 102, a substrate 103, a recording layer 104, a gap layer 105, a wavelength selective film 106, a gap layer 107, a groove film 108, and a base substrate 109, as shown in FIG. 2. On the hologram recording medium 101, interference fringes produced by signal light and reference light are recorded. For example, the hologram recording medium 101 is rotated by an unshown driving device, such as a spindle motor, at a constant rotation velocity (CAV: constant angular velocity). Images in the spatial light modulator 119 can be recorded as multiple holograms on the hologram recording medium 101.

The antireflection film 102 prevents laser light from being reflected by the surface of the recording medium 101.

The substrate 103 functions as a protective layer for protecting the recording layer 104 from the outside.

The recording layer 104 records interference fringes as changes in refractive index (or transmittance). The recording layer 104 may be made of any organic or inorganic material as long as the refractive index (or transmittance) of the material varies depending on the light intensity. The inorganic material is, for example, a photorefractive material, such as lithium niobate ($LiNbO_3$), whose refractive index is varied by an electrooptical effect depending on the exposure. The organic material is, for example, a photopolymer. In the photopolymer, monomers are uniformly dispersed in a matrix polymer in an initial state. When the photopolymer is exposed to light, the monomers are polymerized in the exposed portion. As polymerization proceeds, the monomers move from the periphery, and the concentration of the monomers varies.

Since the refractive index (or transmittance) of the recording layer 104 varies depending on the exposure, as described above, interference fringes produced by interference between reference light and signal light can be recorded as the changes in refractive index (or transmittance) on the hologram recording medium 101.

The wavelength selective film 106 selectively transmits light beams having different wavelengths. That is, of hologram recording laser light S1 and servo control light S2 collected by the objective lens 128, the laser light S1 is transmitted by the wavelength selective film 106, and the laser light S2 is reflected thereby.

The gap layers 105 and 107 serve as spacers provided to cope with the difference in focal length between the laser light S1 and the laser light S2.

The groove film 108 is made of, for example, aluminum, and has various signal patterns for so-called sampled servo control. More specifically, the signal patterns are, for example, a clock pattern for clock generation, a servo pattern for servo control, such as tracking and focusing control on the hologram recording medium 101, and an address pattern used to apply a beam spot of the hologram recording laser light S1 onto a target position on a recording track. The signal patterns are provided in the form of pits. Focus servo control is executed by utilizing groove depth information.

The recording and reproduction light source 111 is a laser light source, for example, a laser diode (LD) that emits light with a wavelength of 405 nm (blue) or with a wavelength of 532 nm (green).

The collimator lens 112 converts the laser light emitted from the recording and reproduction light source 111 into parallel light.

The shielding plate 113 has a pinhole for reducing the beam diameter of the parallel laser light.

The half-wave plate 114 gives a phase difference to the laser light to change the polarization direction.

The polarization beam splitter 115 reflects the laser light from the half-wave plate 114 toward the IS mirror 116, and transmits and directs a part of the laser light to a light receiving element (not shown) in order to control the laser power of the light source 111.

The IS mirror 116 is turned by a driving element 146 to scan the laser light in the circumferential direction of the hologram recording medium 101. The control of the IS mirror 116 will be described in detail below. For example, the driving element 146 is driven piezoelectrically, electromagnetically, or electrostatically.

The mirror 117 reflects the reflected laser light from the IS mirror 116 toward the polarization beam splitter 118.

The polarization beam splitter 118 reflects the laser light incident from the mirror 117 toward the spatial light modulator 119, and transmits reflected light from the spatial light modulator 119.

The spatial light modulator 119 spatially (two-dimensionally) modulates signal light for data superimposition. The spatial light modulator 119 may be, for example, a DMD (digital micromirror device), a reflective liquid crystal element, or a GLV (grating light valve) as a reflective element, or a transmissive liquid crystal element as a transmissive element. In this embodiment, the spatial light modulator 119 generates reference light such as to enclose a circular beam of signal light. That is, a reflective region (for reference light) is provided around a circular modulation region (for signal light) on the spatial light modulator 119 only to simply reflect signals.

The lens 120 and the shielding plate 121 transmit only 0-order light and 1-order light of the signal light emerging from the spatial light modulator 119. The lens 122 converts the transmitted light into parallel light.

The polarization beam splitter 123 transmits the parallel light incident from the lens 122, and reflects reflected light, which is incident from the hologram recording medium 101 via the lens 124, toward the image pickup device 130.

The lens 124 and the shielding plate 125 transmit the 0-order light and the 1-order light emerging from the polarization beam splitter 123, and the lens 126 converts the transmitted light into parallel light.

The dichroic mirror 127 combines an optical path of recording and reproduction light (laser light from the recording and reproduction light source 111) and an optical path of servo light (laser light from the servo light source 131). The dichroic mirror 127 transmits the recording and reproduction light from the recording and reproduction light source 111 and reflects the servo light from the servo light source 131 by utilizing the fact that the recording and reproduction light and the servo light have different wavelengths. A thin film is provided on the surface of the dichroic mirror 127 to totally transmit the recording and reproduction light and to totally reflect the servo light.

The objective lens 128 collects both signal light and the reference light, and servo light from the servo light source 131 onto the hologram recording medium 101, and converts reflected light from the hologram recording medium 101 into parallel light.

The concave lens 129 increases the beam diameter of the reflected light from the hologram recording medium 101 to a size such as to fit the image pickup device 130.

The image pickup device 130 is, for example, a two-dimensional CCD (charge coupled device), and an image of reproduction light is input thereto.

The servo light source 131 emits laser light having a wavelength different from that of the laser light from the recording and reproduction light source 111 in order to execute servo control such as tracking servo control and focus servo control, and to read an address signal. For example, the servo light source 131 is a laser diode, and emits light with a wavelength of 650 nm that has low sensitivity to the hologram recording medium 101.

The collimator lens 132 converts laser light emitted from the servo light source 131 into parallel light.

The grating 133 splits the laser light emerging from the collimator lens 132 into three beams to execute servo control and to read an address signal. The grating 133 is composed of two elements.

The beam splitter 134 transmits the light beams emerging from the grating 133, and reflects return light reflected from the hologram recording medium 101.

The mirror 135 reflects the return light from the beam splitter 134 toward the light receiving element 138. While the beam splitter 134 and the mirror 135 are combined in this embodiment, they may be provided separately.

The light collecting lens 136 collects the return light from the mirror 135 to the light receiving element 138.

The cylindrical lens 137 changes the circular shape of the return light collected by the light collecting lens 136 to an elliptical shape.

The light receiving element 138 receives the return light, and outputs a tracking error signal for tracking servo control, a focus error signal for focus servo control, and an address signal.

The objective lens 128 is driven by a servo driving unit (not shown), such as a driving coil, according to the tracking error signal and the focus error signal output from the light receiving element 138, thereby executing tracking and focus control.

Figure 3:
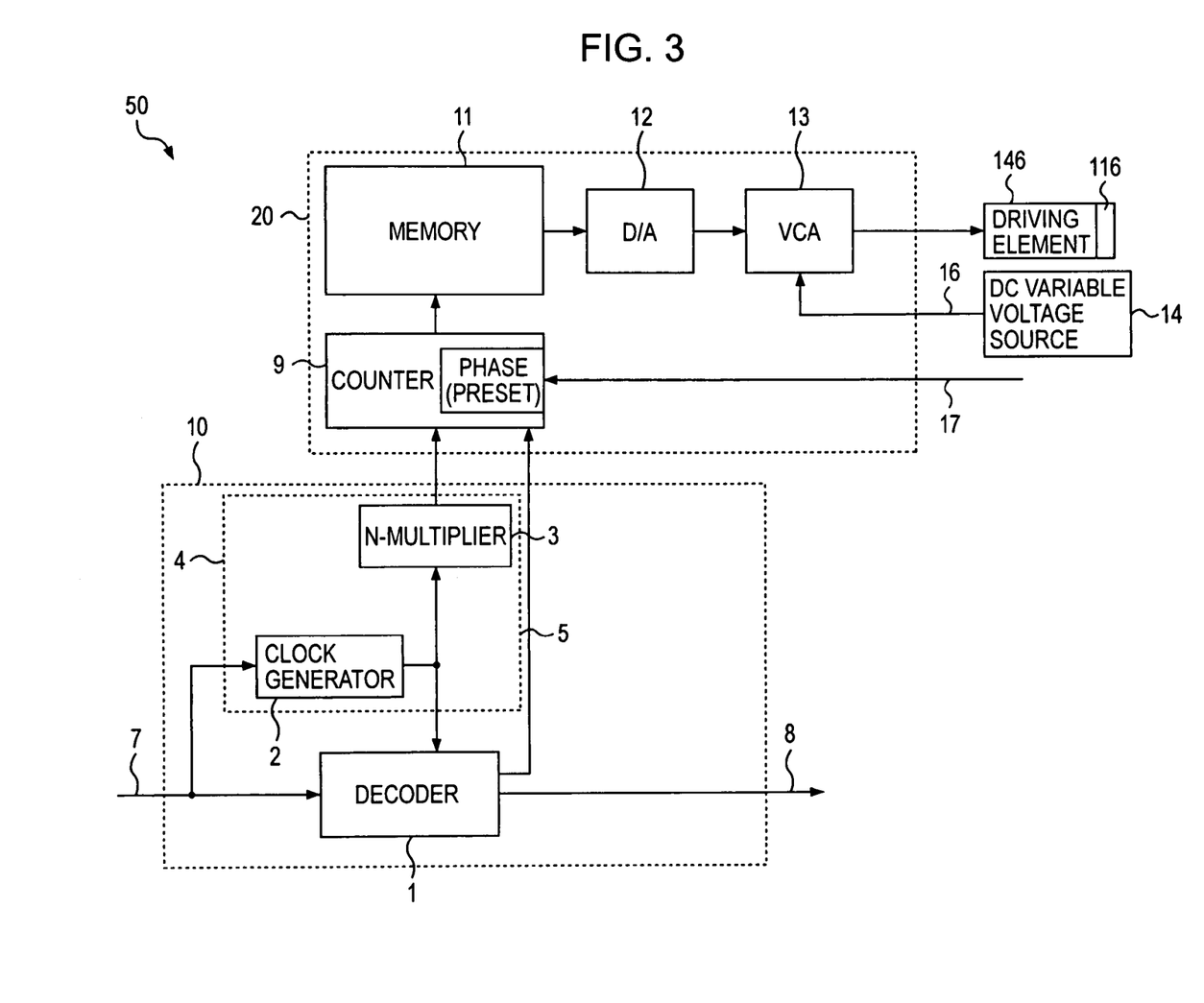
FIG. 3 is a block diagram of a driving system for an image stabilization mirror.

FIG. 3 is a block diagram of a driving system 50 for the IS mirror 116.

The driving system 50 includes a signal processing unit 10, and a mirror-driving-signal generating unit 20 that generates a driving signal for the IS mirror 116 on the basis of a signal processed by the signal processing unit 10.

The signal processing unit 10 includes a decoder 1 and a phase-locked loop (PLL) 4. Read signals 7 detected and read by the light receiving element 138 correspondingly to various patterns are input to the decoder 1 and the PLL 4. The read signals 7 are obtained by subjecting signals detected by the light receiving element 138 to various processing such as amplification, waveform equalization, and A/D (analog/digital) conversion.

The decoder 1 decodes the read signals 7 to obtain information about the block number, the rotation angle, and so on, which will be described below. The decoder 1 thereby acquires address information, and outputs data 8 on the address information to a system controller of a recording and reproducing processing system (not shown). The decoder 1 also outputs reference address pulses 5 to a counter 9, as will be described below.

The PLL 4 includes a clock generator 2 for generating clocks from signals for a clock pattern contained in the read signals 7, and an N-multiplier 3 for multiplying the frequency of the clocks generated by the clock generator 2 by N. The clock generator 2 includes a crystal oscillator, a phase comparator, and a VCO (voltage controlled oscillator) that are not shown.

Figure 4:
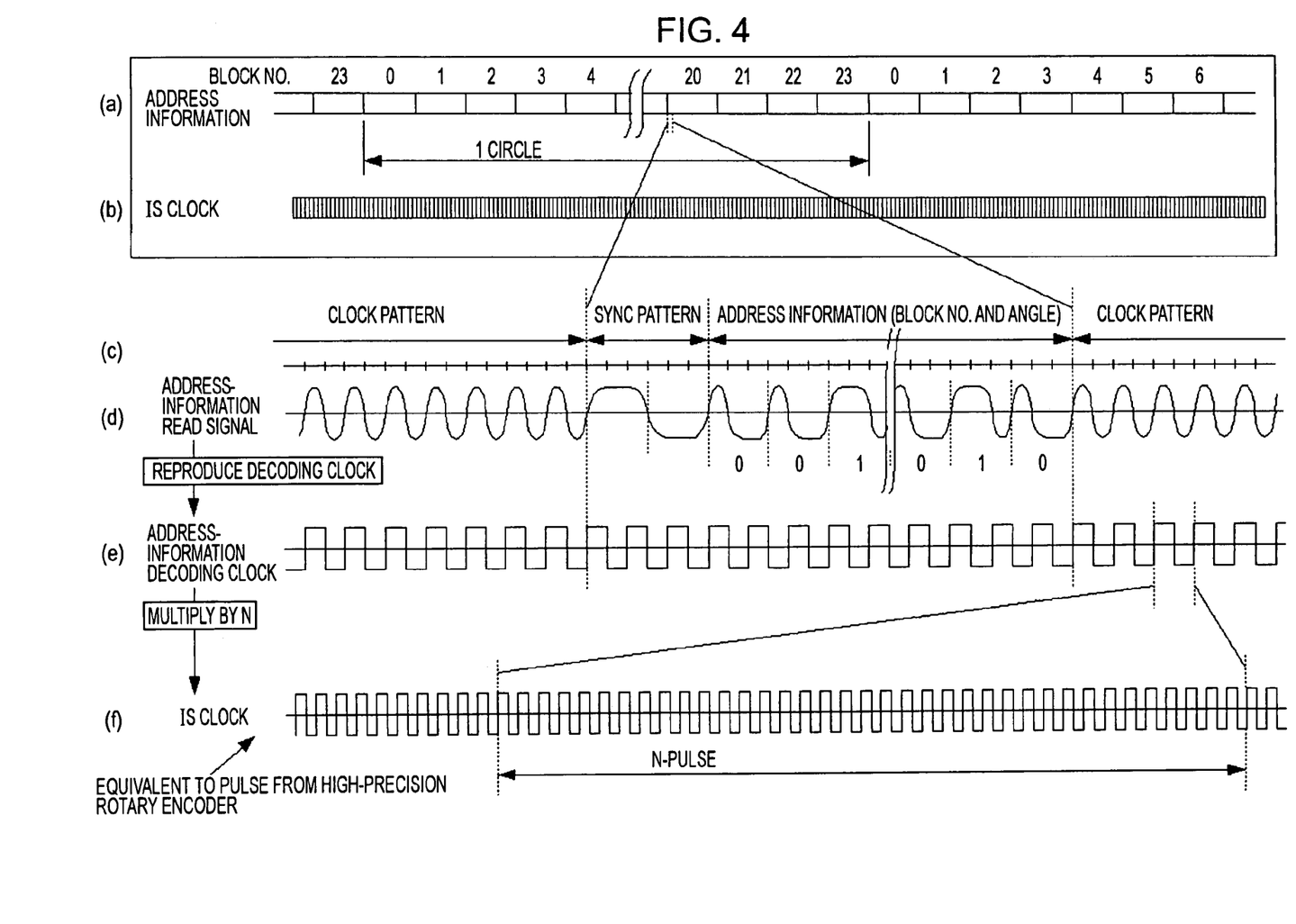
FIG. 4 is a chart showing examples of driving signals for driving the image stabilization mirror.

FIG. 4 shows an example of a driving signal for driving the IS mirror 116. As shown in FIG. 4A, the groove film 108 (shown in FIG. 2) is divided into twenty-four fan-shaped blocks in the circumferential rotating direction of the hologram recording medium 101, and block numbers 0 to 23 are correspondingly assigned to the blocks. The block numbers are patterned on the above-described groove film 108. The blocks with the block numbers are practically used to divide the recording layer 104.

For example, a header of each block includes a unique sync pattern that is provided only at that position, and an address pattern including patterns indicating the above-described block number and angular position. For example, a plurality of different patterns, each indicating the angular position, are provided at different positions in one block in the circumferential direction. A region of the block other than the sync pattern and the address pattern includes a clock pattern. The address pattern may also include a pattern indicating a track number. FIG. 4D shows a signal in which these signal patterns are reproduced as RF signals.

The decoder 1 outputs reference address pulses 5 to the counter 9 in accordance with the sync pattern or the patterns indicating the angular positions. Each reference address pulse 5 is output in response to a corresponding sync pattern, or to a corresponding pattern indicating the angular position. FIG. 4E shows clock signals generated by the PLL 4 so that the address information is decoded by the decoder 1. FIG. 4F shows clock signals obtained by multiplying the frequency of the clock signals shown in FIG. 4E by N with the N-multiplier 3. The clock signals shown in FIG. 4F serve as actuation signals that allow the driving element 146 to drive the IS mirror 116, and are equivalent to signals output from a high-precision rotary encoder when an unshown spindle motor rotates the recording medium 101.

In the hologram recording and reproducing apparatus of this embodiment, the IS mirror 116 is oscillated by the IS operation so that the relative velocity between a target recording region on the rotating recording medium 101 which the hologram recording laser light S1 accesses, and a beam spot of the laser light S1 periodically becomes almost zero.

The mirror-driving-signal generating unit 20 includes the counter 9, a memory 11, a D/A (digital/analog) converter 12, and a VCA (voltage controlled amplifier) 13.

The counter 9 counts IS clock signals generated by the N-multiplier 3, and outputs the count value to the memory 11. The counter 9 also resets the count value in response to a reference address pulse 5 decoded by the decoder 1. That is, the reference address pulse 5 serves as a reset pulse signal.

The memory 11 stores information about oscillation conditions for image stabilization. For example, the information includes data on the frequency and amplitude. The data is stored in the memory 11 as table data in 16 bit/word format.

The D/A converter 12 converts the data output from the memory 11 into analog data, and outputs the analog data to the driving element 146.

The above-described amplitude data can be optimized in a production stage of the hologram recording and reproducing apparatus. Specifically, in the production stage, an operator exerts gain control such that the relative velocity between a target recording region on the rotating recording medium 101 and a beam spot of the first laser light S1 applied onto the recording medium 101 periodically becomes almost zero. More specifically, adjustment is made so that the shape of a path in which the beam moves with the rotation of the recording medium 101 becomes closer to a line (closer to a triangular wave), by appropriately rewriting table data while actually measuring the amount of displacement of the beam caused by the IS mirror 116. For example, the velocity of the above linear portion is adjusted to coincide with the peripheral velocity of the medium at the beam position by utilizing a gain control input 16 from the DC variable voltage source 14 to the VCA 13. Since information about the oscillation conditions for the hologram recording laser light S1 is prestored in this way, data can be recorded while oscillating the laser light S1 without any complicated feedback control.

The gain may be fed back to the VCA 13 by an unshown feedback control system so as to be automatically controlled by the VCA 13.

Figure 5:
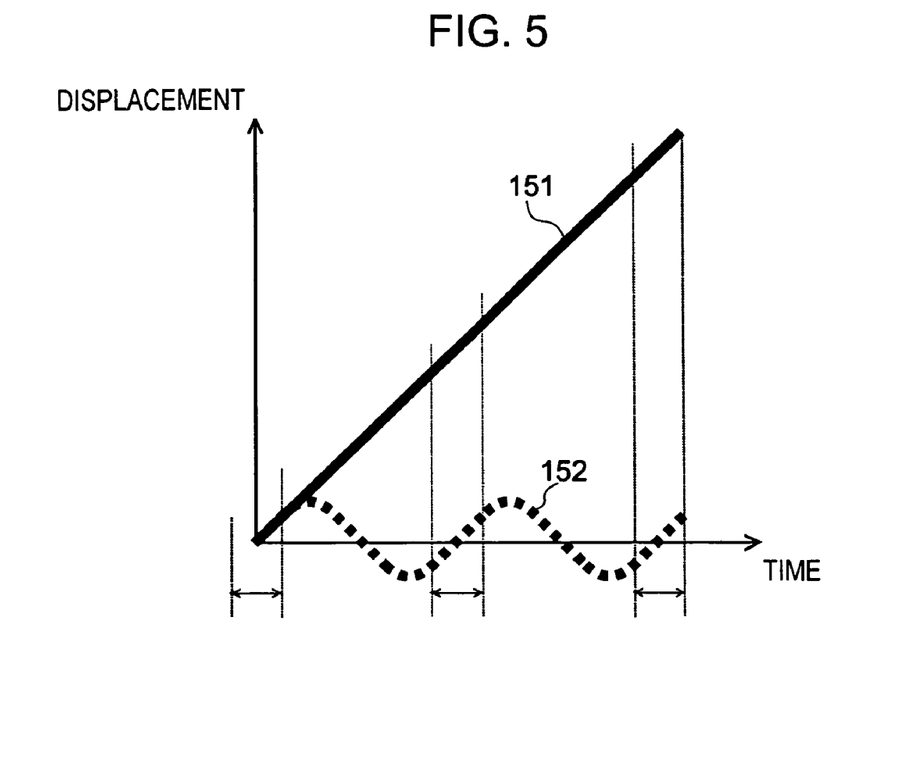
FIG. 5 is a graph showing the relationship between the displacement of a target spot on the recording medium and the displacement of a beam spot of laser light applied by the operation of the image stabilization mirror.

FIG. 5 is a graph showing the relationship between the displacement of a target recording region (or a target spot) on the hologram recording medium 101 in which recording should be performed while the hologram recording medium 101 is rotating, and the displacement of a beam spot of the laser light S1 due to the operation of the IS mirror 116. The horizontal axis indicates the time, and the vertical axis indicates the amount of displacement. A displacement 151 of the target recording region can be expressed as a line in the circumferential rotating direction, and the inclination thereof represents the velocity (linear velocity). A displacement 152 of the beam spot of the laser light S1 can be expressed as an oscillating waveform because the beam spot is oscillated. The relative velocity between the target recording region and the beam spot becomes almost zero at a position where the inclinations of the displacements 151 and 152 are equal to each other. The memory 11 stores the waveform of the displacement 152 of the beam spot in one cycle.

Figure 6:
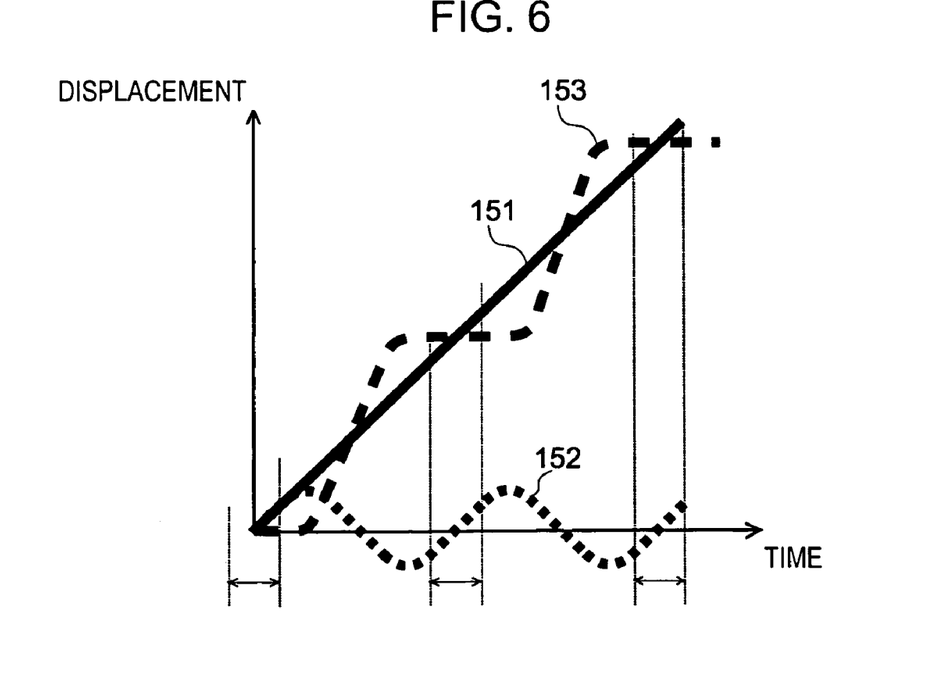
FIG. 6 is a graph showing the relative displacement between the target spot and the beam spot, in addition to the displacements shown in FIG. 5.

FIG. 6 is a graph showing not only the displacement 151 and the displacement 152 shown in FIG. 5, but also a relative displacement 153 therebetween. The relative displacement 153 inclines when the relative velocity is zero, that is, the velocity is zero.

Data 17 input for phase control is unnecessary in principle when recording and reproduction are performed with the same apparatus. This is because the beam spot completely traces the same path during recording and reproduction, and recording and reproduction are performed at the same position. However, the input data 17 is used when the reproduction position needs to be finely adjusted because of the influence of secular changes and temperature drift, or when information recorded by another apparatus is reproduced. For example, when the phase of the path of reciprocating motion is gradually changed from 0° to 360° by using the input data 17 during a continuous reproduction mode, a phase position where data can be most reliably recorded or reproduced is found. By storing and setting the initial position as the input data 17, the phase can be optimized.

A recording operation of the hologram recording and reproducing apparatus will be described below.

In the mirror-driving-signal generating unit 20, driving signals are generated according to the oscillation waveform stored in the memory 11, and the IS mirror 116 is oscillated by the driving element 146.

Laser light emitted from the recording and reproduction light source 111 is converted into parallel light by the collimator lens 112, and enters the half-wave plate 114 after the beam diameter thereof is reduced to a desired diameter by the pinhole of the shielding plate 113.

The laser light emerging from the half-wave plate 114 passes through the polarization beam splitter 115, and is reflected by the oscillating IS mirror 116. The reflected laser light is reflected by the mirror 117 and the polarization beam splitter 118, and enters the spatial light modulator 119.

Signal light and reference light generated by the spatial light modulator 119 pass through the polarization beam splitter 118, the lens 120, the shielding plate 121, the lens 122, the polarization beam splitter 123, the lens 124, the shielding plate 125, the lens 126, the dichroic mirror 127, and the objective lens 128, and are collected at almost the same position on the recording medium 101 while being oscillated.

Figure 7:
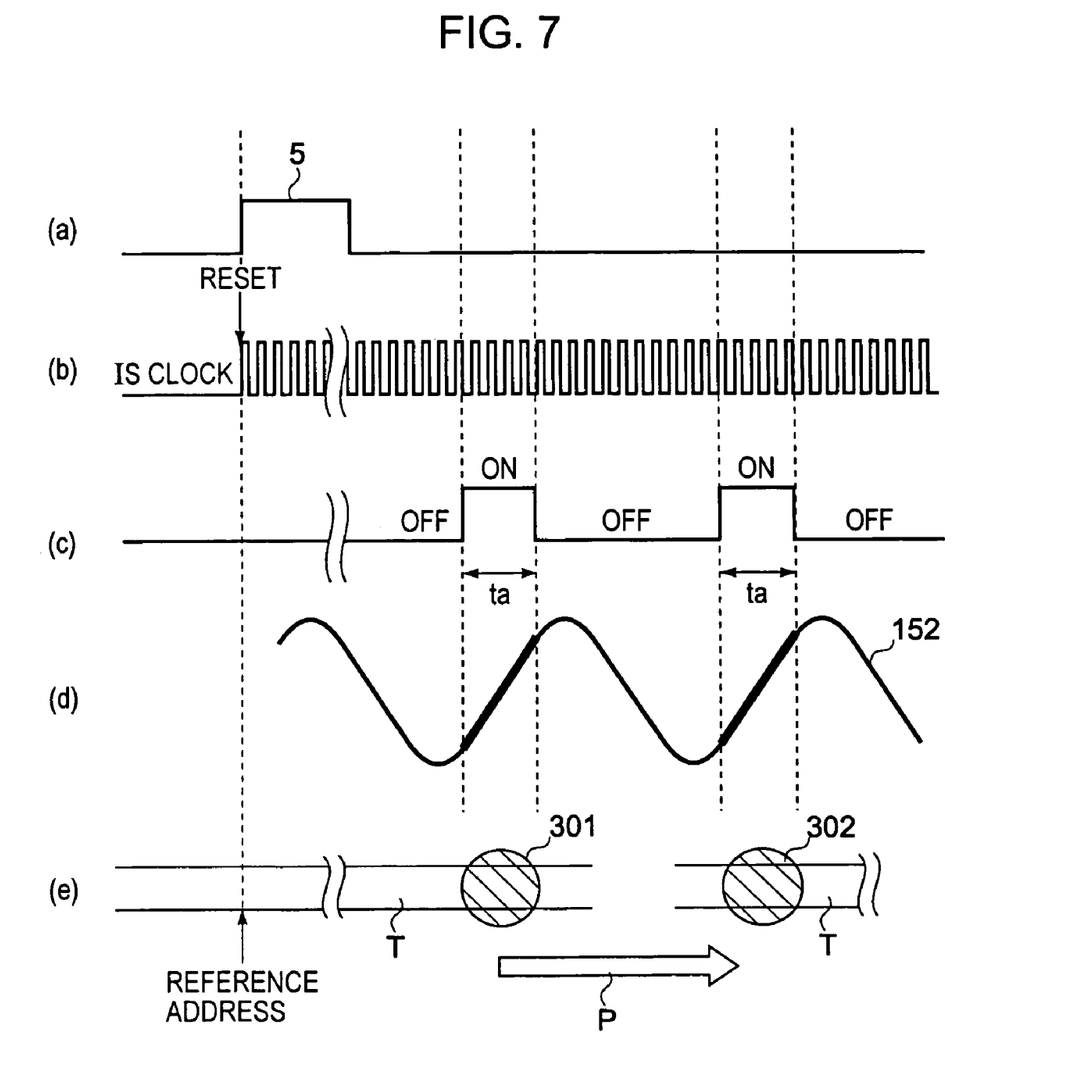
FIG. 7 is a chart showing various signals produced from when a reference address pulse is generated until when a hologram is recorded.
Figure 8:
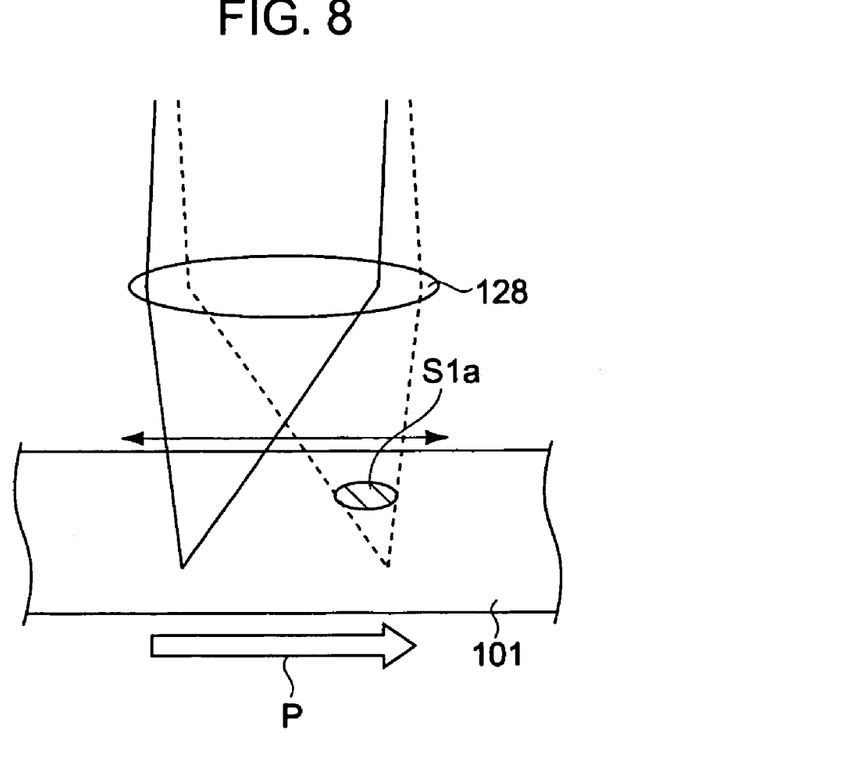
FIG. 8 is an explanatory view showing how a beam spot of hologram recording laser light is oscillated.

Operation of the driving system for the IS mirror 116 will be described below with reference to FIGS. 7, 8, and 9.

When signal patterns of a clock pattern and an address pattern are read with servo laser light S2, the PLL 4 generates a clock. The decoder 1 outputs a reference address pulse 5, which is extracted from the signal patterns, to the counter 9 in response to the clock (FIG. 7A). The counter 9 resets the count value at the time when the reference address pulse 5 is input (FIG. 7B). The system controller in the unshown recording and reproducing processing system for controlling the memory 11 monitors, for example, the oscillation phase of the IS mirror 116. A shutter operation of the spatial light modulator 119 can be conducted (exposure) at the phases, that is, the times (periods "ta" shown in FIG. 7C) such that the linear velocity of a target track on the recording medium 101 becomes substantially equal to the velocity of a beam spot of the hologram recording laser light S1. During exposure, a beam spot S1a of the hologram recording laser light S1 moves in the circumferential rotating direction P of the recording medium 101. The system controller also stores, for example, a count value of the beginnings of the periods ta from the reset position in the memory 11, as the addresses on the recording medium 101.

Figure 9:
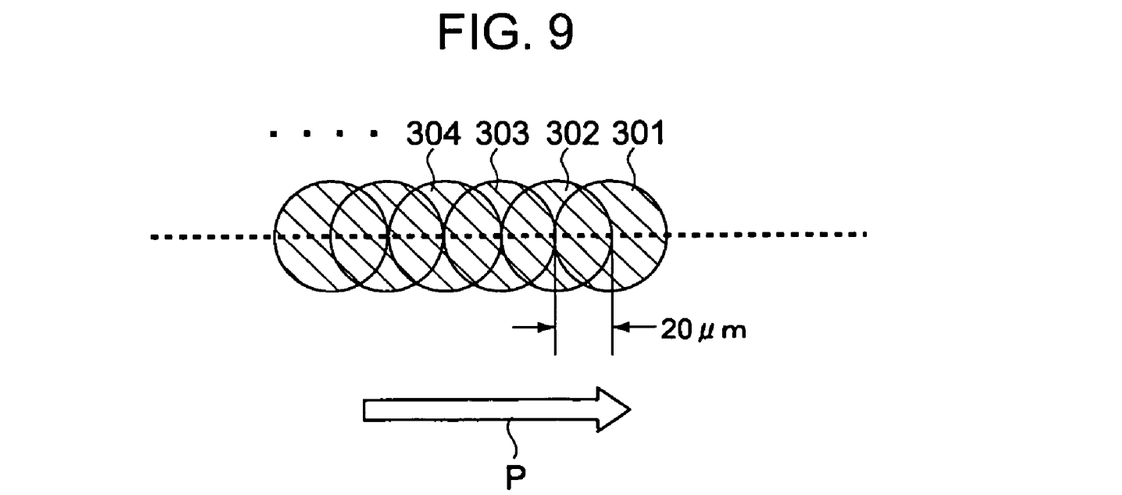
FIG. 9 is an explanatory view showing how multiple holograms are recorded on the recording medium.

In this way, multiple holograms 301, 302, 303, . . . are recorded one by one in the periods "ta" in which the relative velocity between the target recording position and the beam spot becomes almost zero, as shown in FIGS. 7D, 7E, and 9. In this case, for example, the recording pitch is about half the size of a hologram recording mark, that is, 20 μm. When the recording pitch is 20 μm, the oscillation amplitude is preset in the memory 11 so that the oscillation amplitude of the hologram recording mark is 5 μm (displacement of 10 μm).

As described above, the servo laser light is not oscillated, but only the hologram recording laser light is oscillated. Therefore, even when both the servo laser light and the hologram recording laser light are used, it is possible to reliably read various signal patterns with the servo laser light, and to apply the hologram recording laser light to the target track. Further, since the period in which the beam spot is applied to the same position on the recording medium 101 is increased by oscillating the hologram recording laser light, recording can be performed with a sufficient exposure.

Since information about the oscillation conditions of the hologram recording laser light is prestored in the memory 11, data recording can be performed while oscillating the hologram recording laser light without any complicated feedback control. In particular, even when the frequency is high when each hologram is recorded, signals can be easily recorded because a direct feedback control for following the target path is not exerted.

A reproducing operation of the hologram recording and reproducing apparatus will now be described.

During reproduction, only reference light enters the hologram recording medium 101.

Laser light emitted from the recording and reproduction light source 111 passes through the collimator lens 112, the shielding plate 113, the half-wave plate 114, the polarization beam splitter 115, the IS mirror 116, and the mirror 117, is reflected by the polarization beam splitter 118, and enters the spatial light modulator 119.

By making the entire region of signal light in the spatial light modulator 119 "dark", only reference light passes through the polarization beam splitter 118, the lens 120, the shielding plate 121, the lens 122, the polarization beam splitter 123, the lens 124, the shielding plate 125, the lens 126, the dichroic mirror 127, and the objective lens 128, and then enters the hologram recording medium 101.

The driving principle of the IS mirror 116 during reproduction is substantially similar to that during recording. For example, IS clocks are generated in the signal processing unit 10 shown in FIG. 3, in a manner similar to that in recording, and data on the oscillation waveform recorded in the memory 11 is output to the driving element 146 by the mirror-driving-signal generating unit 20, thereby oscillating the IS mirror 116. The system controller grasps the recording position of recording data to be read on the basis of the clock count value from the reference address position (reset position). Therefore, the system controller controls the operation timing of the spatial light modulator 119 so that the reference light is applied at the time when the relative velocity between a target spot, where a hologram recording mark is recorded, and a beam spot of the reference light becomes almost zero. Consequently, refracted light (reproduction light) is generated from a hologram recorded on the recording medium 101.

The generated reproduction light reversely traces the path of the incident light, passes through the objective lens 128, the dichroic mirror 127, the lens 126, the shielding plate 125, and the lens 124, is reflected by the polarization beam splitter 123, and enters the image pickup device 130 via the concave lens 129. In the image pickup device 130, the reproduction light is converted into electrical signals corresponding to two-dimensional spatial data in the spatial light modulator 119. The output from the image pickup device 130 is converted into time-sequential binary data by the unshown recording and reproducing processing system.

In the embodiment of the present invention, the servo laser light is not oscillated, but only reference light is also oscillated during reproduction. Therefore, even when both the servo laser light and the reference laser light are used, it is possible to reliably read various signal patterns with the servo laser light, and to apply the reference light onto the target spot. In addition, since the period in which the beam spot of the reference light is applied onto one hologram recording mark is increased by oscillating the reference light, a high-level RF signal is obtained, and reproduction is performed with a high S/N ratio.

It should be understood by those skilled in the art that various modifications, combinations, sub-combinations and alterations may occur depending on design requirements and other factors insofar as they are within the scope of the appended claims or the equivalents thereof.

For example, while the single IS mirror 116 is provided in the above embodiment, two or more IS mirrors may be provided. Further, a device for checking whether the IS mirror 116 is properly oscillated may be provided.

The invention claimed is:

1. A hologram recording apparatus, comprising:
   a rotating mechanism for rotating a hologram recording medium;
   a first light source for emitting first laser light;
   a modulator for modulating the intensity of the emitted first laser light to record a hologram on the hologram recording medium;
   a second light source for emitting second laser light with which a predetermined signal pattern is read from the rotating hologram recording medium, the predetermined signal pattern being used to apply the modulated first laser light to a target recording region on the hologram recording medium; and
   control means for exerting control on the basis of the read signal pattern so that the intensity of the first laser light is modulated by the modulator while the first laser light is being oscillated and so that a beam spot of the first laser light is applied onto the hologram recording medium in periods in which the relative velocity between the target recording region on the rotating hologram recording medium and the beam spot of the first laser light becomes almost zero.

2. The hologram recording apparatus according to claim 1, wherein the control means comprises:
   an optical member provided on an optical path to guide the first laser light emitted from the first light source to the modulator; and
   a driving element for oscillating the optical member.

3. The hologram recording apparatus according to claim 2, wherein the control means comprises:

a memory that stores information about an oscillation condition for oscillating the first laser light; and a control unit for exerting control such that the intensity of the first laser light is modulated by the modulator while driving the driving element according to the stored information.

4. The hologram recording apparatus according to claim 3, wherein the memory stores amplitude information as the oscillation condition.

5. The hologram recording apparatus according to claim 3, wherein a clock pattern for hologram recording and a pattern indicating the reference rotational position of the hologram recording medium are prerecorded as the signal pattern on the hologram recording medium, and the control means comprises:

clock generating means for generating clocks on the basis of the clock pattern;

counting means for counting the generated clocks; and means for storing the clock count value from the reference rotational position in the memory.

6. A hologram reproducing apparatus, comprising:

a rotating mechanism for rotating a hologram recording medium;

a first light source for emitting first laser light;

generating means for generating reference light from the emitted first laser light in order to reproduce a hologram signal recorded on the hologram recording medium;

a second light source for emitting second laser light with which a predetermined signal pattern is read from the rotating hologram recording medium, the predetermined signal pattern being used to apply the emitted first laser light to a target spot on the hologram recording medium; and control means for exerting control on the basis of the read signal pattern so that the reference light is generated by the generating means while the first laser light is being oscillated and so that a beam spot of the first laser light is applied onto the hologram recording medium in periods in which the relative velocity between the target spot on the rotating hologram recording medium and the beam spot of the first laser light becomes almost zero.

7. A hologram recording method, comprising:

emitting first laser light to record a hologram on a rotating hologram recording medium;

emitting second laser light to read a predetermined signal pattern from the rotating hologram recording medium, the predetermined signal pattern being used to apply the first laser light to a target recording region on the hologram recording medium; and modulating the intensity of the first laser light while oscillating the first laser light on the basis of the read signal pattern so that a beam spot of the first laser light is applied to the recording medium in periods in which the relative velocity between the target recording region on the rotating hologram recording medium and the beam spot becomes almost zero.

8. A hologram reproducing method, comprising:

emitting first laser light to reproduce a hologram signal recorded on a rotating hologram recording medium;

emitting second laser light to read a predetermined signal pattern from the rotating hologram recording medium, the predetermined signal pattern being used to apply the first laser light to a target spot on the hologram recording medium; and generating reference light from the first laser light while oscillating the first laser light on the basis of the read signal pattern so that a beam spot of the first laser light is applied to the hologram recording medium in periods in which the relative velocity between the target spot on the rotating hologram recording medium and the beam spot becomes almost zero.

9. A hologram recording apparatus, comprising:

a rotating mechanism for rotating a hologram recording medium;

a first light source for emitting first laser light;

a modulator for modulating the intensity of the emitted first laser light to record a hologram on the hologram recording medium;

a second light source for emitting second laser light with which a predetermined signal pattern is read from the rotating hologram recording medium, the predetermined signal pattern being used to apply the modulated first laser light to a target recording region on the hologram recording medium; and a controller operable to exert control on the basis of the read signal pattern so that the intensity of the first laser light is modulated by the modulator while the first laser light is being oscillated and so that a beam spot of the first laser light is applied onto the hologram recording medium in periods in which the relative velocity between the target recording region on the rotating hologram recording medium and the beam spot of the first laser light becomes almost zero.

10. A hologram reproducing apparatus, comprising:

a rotating mechanism for rotating a hologram recording medium;

a first light source for emitting first laser light;

a generator operable to generate reference light from the emitted first laser light in order to reproduce a hologram signal recorded on the hologram recording medium;

a second light source for emitting second laser light with which a predetermined signal pattern is read from the rotating hologram recording medium, the predetermined signal pattern being used to apply the emitted first laser light to a target spot on the hologram recording medium; and a controller operable to exert control on the basis of the read signal pattern so that the reference light is generated by the generator while the first laser light is being oscillated and so that a beam spot of the first laser light is applied onto the hologram recording medium in periods in which the relative velocity between the target spot on the rotating hologram recording medium and the beam spot of the first laser light becomes almost zero.

* * * * *